No. 864,701.

PATENTED AUG. 27, 1907.

R. D. SHAWVER.
LOCK HOOK.
APPLICATION FILED MAR. 26, 1907.

Witnesses

Inventor
R. D. Shawver
By
Attorney

UNITED STATES PATENT OFFICE.

RUFUS D. SHAWVER, OF DEIGHTON, OKLAHOMA TERRITORY.

LOCK-HOOK.

No. 864,701.  Specification of Letters Patent.  Patented Aug. 27, 1907.

Application filed March 26, 1907. Serial No. 364,566.

*To all whom it may concern:*

Be it known that I, RUFUS D. SHAWVER, a citizen of the United States, residing at Deighton, in the county of Woodward and Territory of Oklahoma, have invented a certain new and useful Lock-Hook, of which the following is a specification, reference being had therein to the accompanying drawing.

This invention relates to lock hooks, the object of the invention being to provide a device somewhat on the order of a snap hook in which provision is made for closing the entrance to the hook by means of a guard, which, when in guarding position is held locked securely against accidental opening and yet is capable of being easily and quickly released so that the guard may be moved out of the way, a further object of the invention being to make the guard of such construction and arrangement that, when moved out of the way, it will act to eject the eye or other object held by the hook. When the hook is closed, the greater the strain brought to bear thereon in the normal direction, the more firmly will the guard be held closed, thus rendering the hook as a whole perfectly reliable.

With the above and other objects in view, the invention consists in the novel construction, combination and arrangement of parts, as herein fully described, illustrated and claimed.

Figure 1:
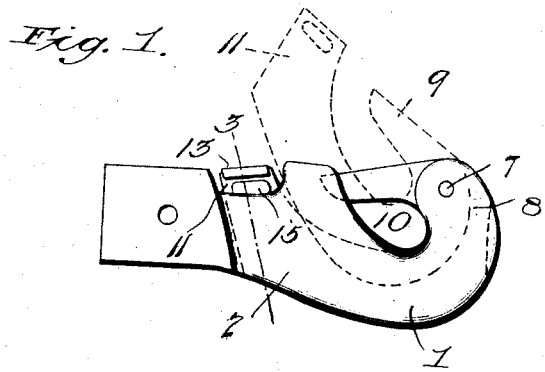
Figure 2:
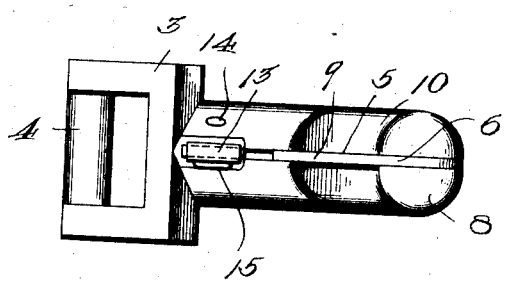
Figure 3:
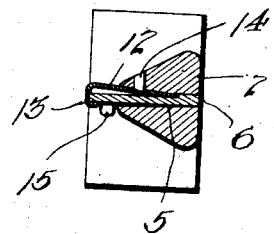

In the accompanying drawings:—Figure 1 is a side elevation of a hook embodying the present invention, showing by dotted lines the manner of opening the guard hook. Fig. 2 is a plan or top view of the same. Fig. 3 is a cross section through the hook on the line 3—3 of Fig. 1.

The main hook 1 comprises a shank 2 with which is associated a frame 3, substantially U-shaped or three sided in plan as shown in Fig. 2, and having an attaching or holding bar 4 to adapt the hook to be connected with a strap or other object.

In carrying out the invention the shank 2 and the greater portion of the body of the hook 1 are slotted or recessed as shown at 5 to receive a pivotally mounted guard hook 6, the latter being pivoted at 7 within the slot in the point or bill 8 of the main hook 1, as clearly shown in Fig. 1. The guard hook 6 is of the same general shape as the main hook 1 and when closed registers therewith, but is made considerably thinner as shown in Fig. 2 and is provided with a long projecting point or bill portion 9, which, when the guard hook is closed extends across the entrance throat 10 of the main hook and prevents the escape of the object held thereby. The guard hook also comprises a shank 11, which is received in the slotted shank 2 of the main hook, and at this point the main hook has its slot widened somewhat to admit a spring catch 12 carried by the guard hook and consisting of a flat spring fastened at one end to the shank 11, the other end thereof being left free and provided with a lip or flange 13 which projects across the shank 11 and is hooked behind the opposite side thereof as best illustrated in Fig. 3. The catch 12 is provided with a hole to admit a pin or stud 14 attached to the main hook and projecting into the slot 5. In closing the guard hook the catch springs away from the shank 11 and snaps over the pin or shoulder 14 and thereby locks the guard hook against opening.

On the side of the shank 11 opposite the catch 12 is a lug or knob 15 which projects laterally from the shank 11 far enough to form a finger or thumb rest. In order to release the catch and thereby unlock the hook, the catch and lug 15 are subjected to the pressure of the thumb and finger which has the effect of deflecting the catch inward toward the shank 11, thus disengaging the catch from the pin or shoulder 14, whereupon the guard hook may be thrown outward, carrying with it the object held by the main hook and guard hook. Owing to the disposition of the bend of the main and guard hooks and the pivot which connects the same, any pulling strain on the hook in the normal line will tend to hold the guard hook the more tightly closed.

I claim:—

1. A lock hook embodying a main hook having a slotted shank and body, a guard hook movable into and out of the slot of the main hook and pivotally connected to the point or bill of the main hook, a spring catch carried by the guard hook, and a shoulder on the main hook adapted to be engaged by and to interlock with said catch.

2. A lock hook embodying a slotted main hook, a guard hook pivotally connected to the main hook and adapted to move in the slot thereof to close and open the entrance throat of the main hook, a shoulder on the main hook, a spring catch on the guard hook movable laterally into engagement with the said shoulder, and a finger lug or knob on the guard hook adapting the spring catch to be thrown out of engagement with said shoulder by pressure of the finger transversely to the plane of movement of the guard hook.

In testimony whereof I affix my signature in presence of two witnesses.

RUFUS D. SHAWVER.

Witnesses:
S. G. SIMMONS,
THOS. W. HAIR.